United States Patent [19]

Miyakawa et al.

[11] Patent Number: 4,576,888

[45] Date of Patent: Mar. 18, 1986

[54] TONER FOR ELECTROPHOTOGRAPHY COMPRISING AZOIC PIGMENT HAVING SILICA CORE

[75] Inventors: Nobuhiro Miyakawa, Abiko; Kouji Maekawa, Kyoto; Teruaki Higashiguchi, Tokyo; Kaname Nakatani, Kawasaki, all of Japan

[73] Assignee: Mita Industrial Company, Limited, Osaka, Japan

[21] Appl. No.: 583,425

[22] Filed: Feb. 24, 1984

[30] Foreign Application Priority Data

Feb. 28, 1983 [JP] Japan .................................. 58-30950

[51] Int. Cl.$^4$ ............................................. G03G 9/08
[52] U.S. Cl. ................................. 430/106; 106/308 B; 430/110; 428/405
[58] Field of Search ..................... 106/308 B; 430/106, 430/105, 110; 428/405

[56] References Cited

U.S. PATENT DOCUMENTS

| 3,689,300 | 9/1972 | Bunger et al. | 106/308 B X |
| 3,720,617 | 3/1973 | Chatterji et al. | 430/110 |
| 4,039,463 | 8/1977 | De Roo et al. | 428/404 X |
| 4,151,154 | 4/1979 | Berger | 428/405 X |

OTHER PUBLICATIONS

Chemical Abstracts, vol. 94/165641p (1981).

Primary Examiner—John D. Welsh
Attorney, Agent, or Firm—Wenderoth, Lind & Ponack

[57] ABSTRACT

A toner for electrophotography, comprising an azoic pigment having a silica core as a coloring component, said azoic pigment comprising a core of a fine powder of silica and a coating of a mono- or polyazoic dye chemically bound to the surface of the silica core through an aminosilane coupling agent.

14 Claims, 1 Drawing Figure

TONER FOR ELECTROPHOTOGRAPHY COMPRISING AZOIC PIGMENT HAVING SILICA CORE

BACKGROUND OF THE INVENTION

This invention relates to novel azoic pigments, and more specifically to azoic pigments containing a fine powder of silica as a core and having a high color density and excellent fastness, solvent resistance, water resistance, heat resistance and light permeability, a process for production thereof, and to the use of these azoic pigments in a toner for electrophotography.

It was recently reported that Sudan I, an azoic dye, is formed on a nucleus of silica gel by esterifying silica gel with phenol or a phenylalkanol utilizing the reactivity of its surface silanol groups to introduce a phenyl group into the surface of silica gel, and thereafter subjecting the phenyl group to nitration, reduction, diazotization and coupling (see Shikizai (Color Materials), 55 [5]280–287, 1982).

The azoic pigment formed by using esterified silica gel, however, has various defects. For example, the esterification of silica gel requires high temperatures, and the yield of the ester is low. Moreover, the resulting ester linkage is highly polarized and is susceptible to hydrolysis.

SUMMARY OF THE INVENTION

The present inventors have made extensive investigations for the purpose of obtaining azoic dyes having a silica core which are free from the aforesaid defects and have excellent fastness, good light permeability and a high color density. These investigations have now led to the discovery that the above purpose is achieved by chemically binding an azoic dye to the surface of a fine powder of silica having a small particle diameter, particularly a particle diameter of not more than 10 microns through an aminosilane coupling agent.

BRIEF DESCRIPTION OF THE DRAWING

The drawing shows the relationship between the specific charge of a toner and kneading time for the present invention (solid line) and a comparative example (broken line).

DETAILED DESCRIPTION OF THE INVENTION

Figure 1:
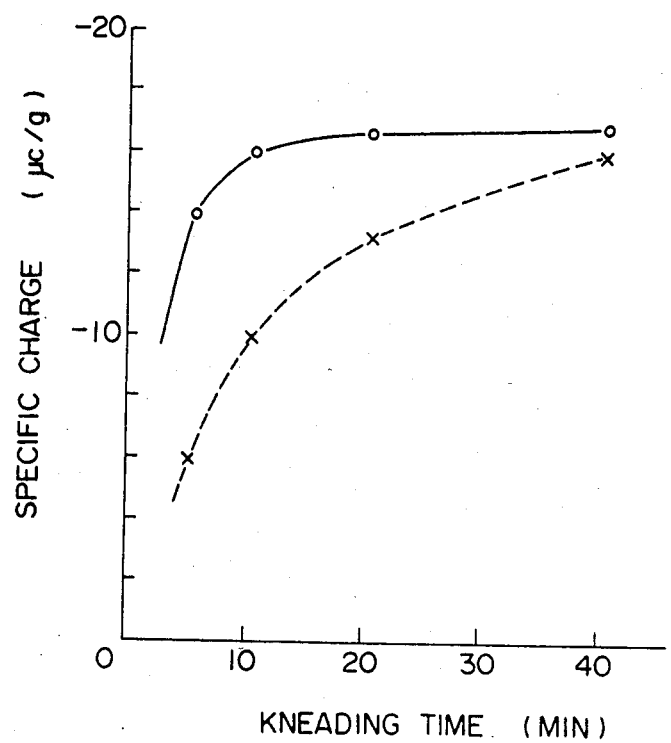

According to this invention, there is provided an azoic pigment having a silica core comprising a core of a fine powder of silica having a small particle diameter, preferably a particle diameter of not more than 10 microns and a coating of a mono- or polyazoic dye chemically bound to the surface of the silica core through an aminosilane coupling agent.

The azoic pigment of the present invention is of a structure in which the surface silanol groups of the fine silica powder are chemically bound to the residue of the mono- or polyazoic dye through the aminosilane coupling agent. Its basic structure can, for example, be shown schematically by the following formula.

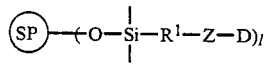  (I)

In the formula, 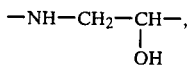 represents the fine silica powder; $R^1$ represents a lower alkylene group which may contain —NH— or —NHCO— in the chain; Z represents an amino bridging member such as —NHCO,

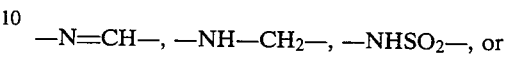

—N=CH—, —NH—CH$_2$—, —NHSO$_2$—, or

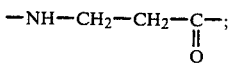

D represents a residue of a mono- or polyazoic dye; and l is a number of at least 1.

The term "lower", as used herein to qualify a group or a compound, means that the group or compound so qualified has not more than 6, preferably not more than 4, carbon atoms.

In formula (I), the "lower alkylene group which may contain —NH— or —NHCO— in the chain" represented by $R^1$ includes alkylene groups having 3 to 6 carbon atoms which may contain —NH— or —NHCO— in the chain such as —CH$_2$CH$_2$CH$_2$—, —CH$_2$CH$_2$CH$_2$CH$_2$—, —CH$_2$CH$_2$CH$_2$—NH—CH$_2$CH$_2$—, and —CH$_2$CH$_2$CH$_2$—NHCO—.

The residue of the mono- or polyazoic dye represented by D in formula (I) includes the following groups, for example.

 (1)

 (2)

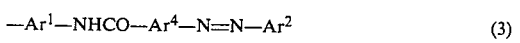 (3)

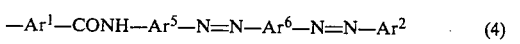 (4)

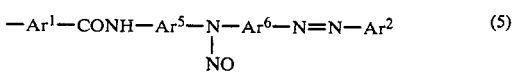 (5)

In the above general formulae, $Ar^1$, $Ar^3$, $Ar^4$, $Ar^5$ and $Ar^6$, independently from each other, represent a phenylene or naphthylene group which may be substituted, and $Ar^2$ represents a group derived from a coupling component.

Substitutents which may be present on the benzene or naphthalene ring in the "phenylene or naphthylene ring which may be substituted" represented by $Ar^1$, $Ar^3$, $Ar^4$, $Ar^5$ and $Ar^6$ may be any groups which can usually be found in the field of azoic dye chemistry. Examples include lower alkoxy groups such as methoxy and ethoxy, lower alkyl groups such as methyl, ethyl, n-propyl, isopropyl, n-butyl, isobutyl, sec-butyl and tert-butyl; halogen atoms such as chlorine, bromine and fluorine, mono- or di-(lower alkyl)amino groups such as methylamino, ethylamino, dimethylamino and diethylamino, and a nitro group. Thus, the following groups may be cited as specific examples of the optionally substituted phenylene or naphthylene group.

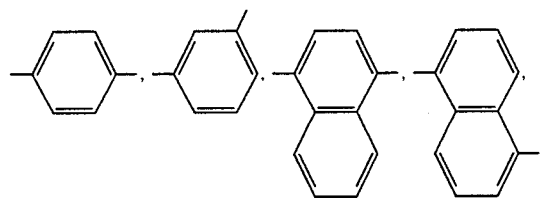
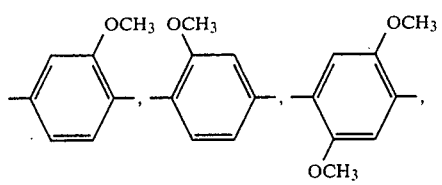
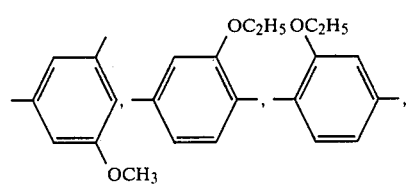
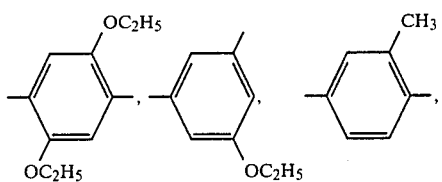
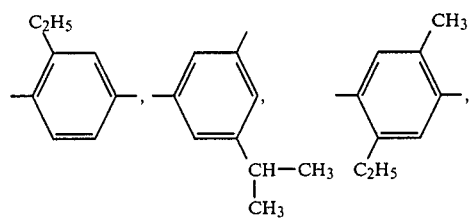
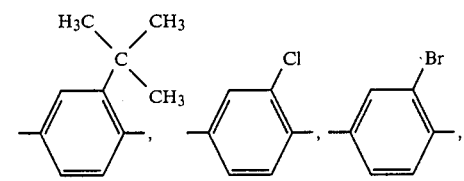
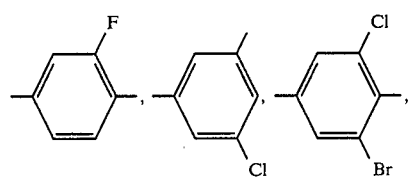
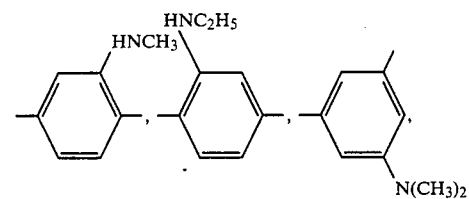

-continued

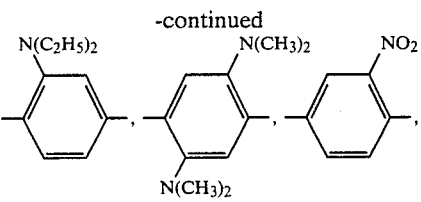
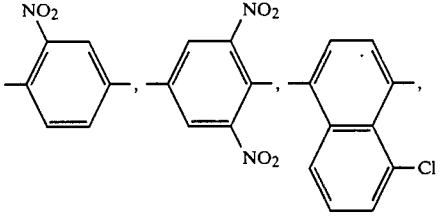
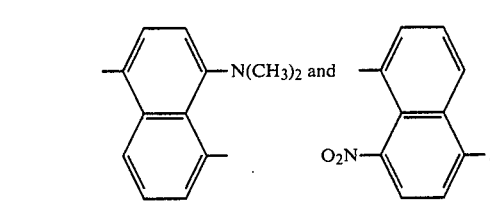

On the other hand, the "group derived from a coupling component" represented by Ar² includes groups of couling components which are seen in ordinary azoic dyes. Typical examples are given below.

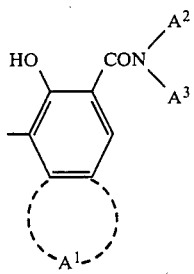

In the formula, A¹ represents a group which, together with the benzene ring, forms a polynuclear aromatic ring such as a naphthalene or anthracene ring, or a heterocyclic ring such as an indole, carbazole or benzofuran ring; and each of A² and A³ represents a hydrogen atom of an alkyl, cycloalkyl, aryl, aralkyl or heterocyclic group which may be substituted, or A² and A³, together with the nitrogen atom to which they are bonded, may form a 5- or 6-membered heterocyclic group which may be substituted.

Examples of the group (A) are given below.

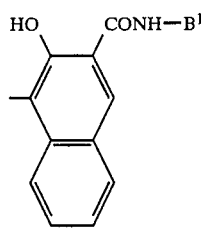

In the formula, B¹ represents an aromatic ring (such as a benzene, naphthalene, carbazole, benzofurane or pyridine ring) which may be mono-, di- or tri-substituted by a halogen atom such as chlorine, bromine or fluorine, a lower alkyl group such as methyl, ethyl, propyl or butyl, a lower alkoxy group such as methoxy, ethoxy, propoxy or butoxy, a nitro group, a cyano group, a carboxyl group, a sulfonate group or a sulfonic acid group; a phenyl-lower alkyl group; or a chloro-lower alkyl group.

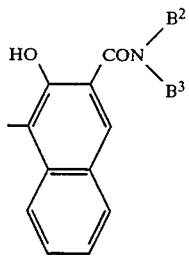

In the formula, $B^2$ and $B^3$ represent a phenyl group which may be substituted by a halogen atom such as chlorine or bromine, a lower alkyl group such as methyl or ethyl, or a lower alkoxy group such as methoxy or ethoxy, or a lower alkyl group such as methyl, ethyl or propyl.

More specific examples of the group (A) are shown below.

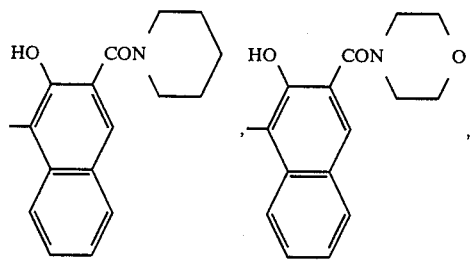

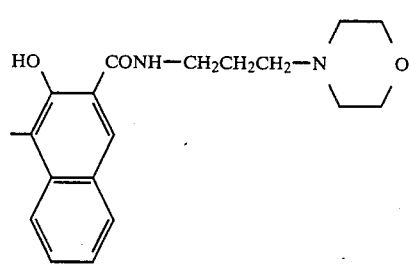

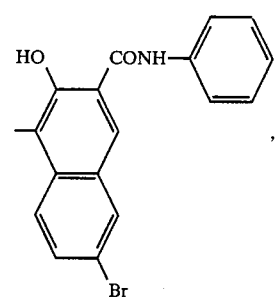

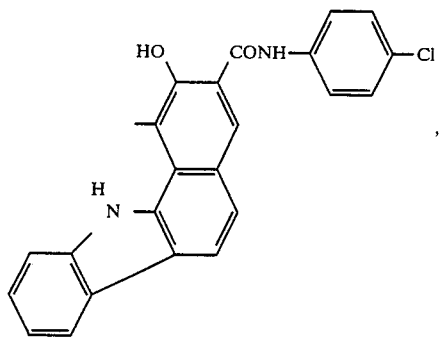

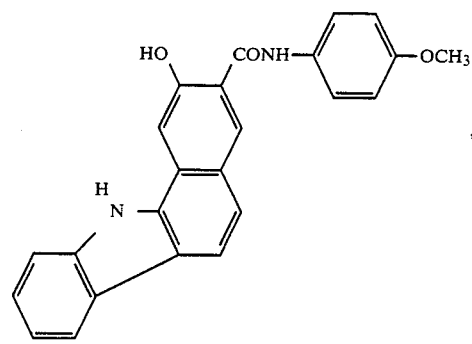, and

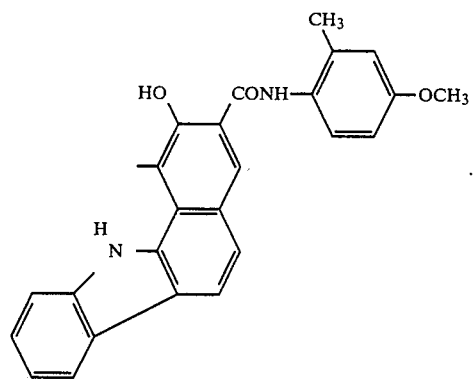

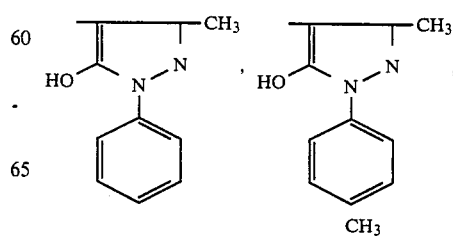 (B)

In the formula, $A^4$ represents s lower alkyl group, a carboxyl group or a lower alkoxycarbonyl group, and $Ar^7$ represents a phenyl or naphthyl group which may be substituted.

Examples of the group (B) are shown below.

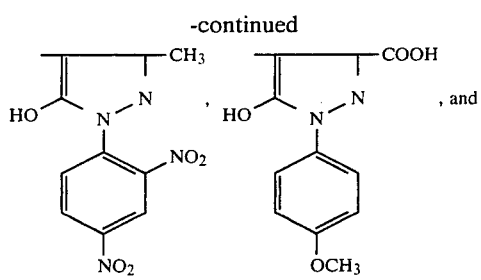

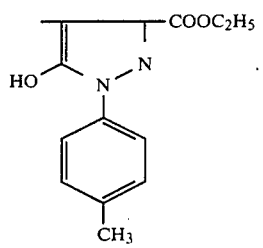

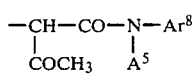 (C)

In the formula, $A^5$ represents a hydrogen atom, a lower alkyl group, or an optionally substituted phenyl group, and $Ar^8$ represents a phenyl or naphthyl group which may be substituted.

Examples of the group (C) are given below.

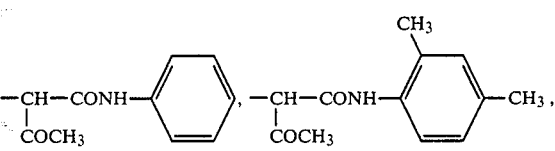

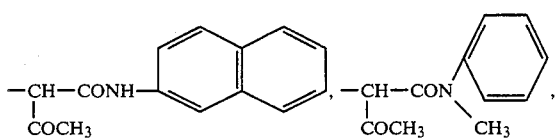

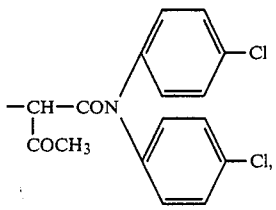

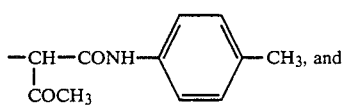

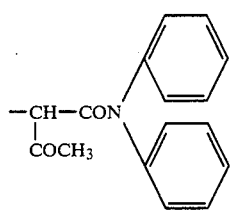

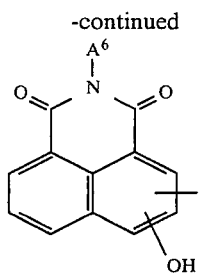 (D)

In the formula, $A^6$ represents a hydrogen atom, a lower alkyl group, a hydroxy-lower alkyl group or a lower alkoxy-lower alkyl group.

Examples of the group (D) are given below.

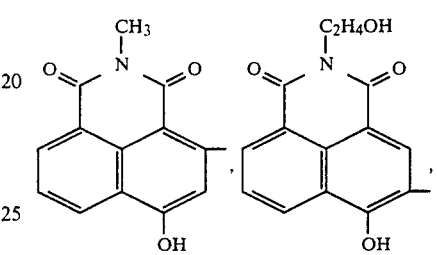

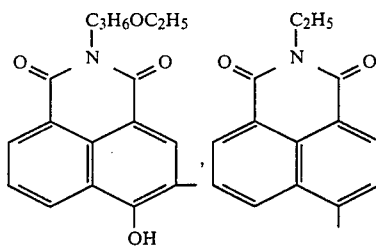

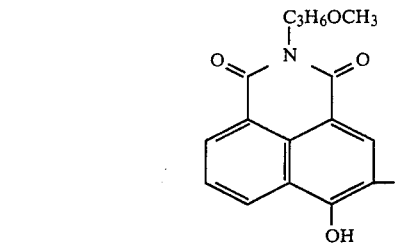

The azoic pigment of this invention can be produced by first treating the surface of a fine powder of silica which is to become a core of the pigment with an aminosilane coupling agent to introduce the amino group into its surface, and thereafter binding the residue of a mono- or polyazoic dye such as those represented by formulae (1) to (5) to the amino group in a customary manner.

The production of the azoic pigment in accordance with this invention will be described below in detail.

The fine silica powder which becomes the core of the azoic pigment of this invention is generally a fine powder of silica having an average particle diameter of not more than 10 microns. The suitable particle diameter varies depending upon the use of the final product. Generally, as its particle size becomes smaller, it is easier to handle and is advantageous in mixing with other materials. The suitable particle diameter of the silica powder is therefore not more than 5 microns, preferably not more than 0.1 micron. Specific examples of such a fine powder of silica are dry-method silicas which are commercially available, for example, under tradename "Aerosil" (a product of Japan Aerosil Co., Ltd.), and wet-method silicas which are commercially available, for example, under tradenames "Syloid" (a product of Fuji Davison Chemical Co., Ltd.), "Mizukasil" (a product of Mizusawa Kagaku Kogyo Kabushiki Kaisha) and "Tokusil" (a product of Tokuyama Soda Co., Ltd.). Especially preferred silicas are those having a surface OH density of at least $0.01/100$ Å$^2$, preferably at least $1/100$ Å$^2$. The surface OH density, as used herein is determined by the following procedure. One gram of a sample is heated to 1000° C. from 150° C., and the weight decrease (ignition loss) at this time is measured. All the decreased weight is regarded as the weight of water which is liberated and formed from two adjacent silanol groups on the surface of the sample. The weight decrease is multiplied by $2 \times 6 \times 10^{23}/18$ and then divided by the separately measured BET specific surface area (m$^2$/g) of the sample. The unit of the quotient obtained is converted into number/100 Å$^2$.

The silica powder may be used directly, or as required, after it has been surface-treated with an acid such as sulfuric acid or hydrochloric acid, or an alkali such as sodium hydroxide or potassium hydroxide.

The fine powder of silica is then treated with the aminosilane coupling agent. Suitable aminosilane coupling agents used in this treatment are those of the following formula

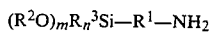  (II)

wherein R$^1$ is as defined hereinabove, R$^2$ represents a lower alkyl group, R$^3$ represents a hydrogen atom or a lower alkyl group, m is an integer of 1 to 3, and n is 0, 1 or 2 provided that m+n=3.

The "lower alkyl group" represented by R$^2$ and R$^3$ in general formula (II) may be linear or branched, and includes, for example, methyl, ethyl, n-propyl, isopropyl, n-butyl, isobutyl, sec-butyl, and tert-butyl. The "lower alkylene group which may contain —NH— or —NHCO— in the chain" represented by R$^1$ may include those having 3 to 6 carbon atoms, such as —CH$_2$CH$_2$CH$_2$—, —CH$_2$CH$_2$CH$_2$CH$_2$—, —CH$_2$CH$_2$CH$_2$—NH—CH$_2$CH$_2$—, and —CH$_2$CH$_2$CH$_2$—NHCO—.

Examples of the aminosilane coupling agents which may be advantageously used in this invention include

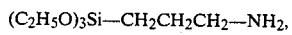

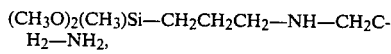

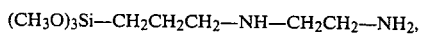

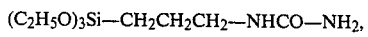

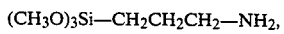

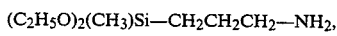

, and

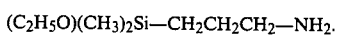

The treatment of the fine powder of silica with the aminosilane coupling agent can usually be carried out by contacting the silica with the aminosilane coupling agent in a suitable liquid medium. Examples of the liquid medium include water, alcohols such as methanol, ethanol or propanol, and mixtures of water with these alcohols. The treating temperature is generally from room temperature to the refluxing temperature of the medium, preferably the refluxing temperature of the medium. The amount of the aminosilane coupling agent used is not strictly limited. Generally, it is advantageously used in an amount of at least 0.5 part by weight, preferably 5 to 20 parts by weight, per 100 parts by weight of the fine silica powder.

By treating the fine silica powder with the aminosilane coupling agent, condensation reaction (coupling reaction) takes place between the surface silanol groups of the silica and the alkoxy group (R$^1$O) of the aminosilane coupling agent to give a fine powder coated with the aminosilane coupling agent. When the aminosilane coupling agents contains two or more alkoxy groups (R$^1$O), the molecules of the aminosilane coupling agent react with each other simultaneously with the above condensation reaction, thereby forming a siloxane linkage and forming a three-dimensionally crosslinked coating of the aminosilane coupling agent on the fine silica powder.

The fine silica powder treated with the aminosilane coupling agent has a general structure represented by the following formula

  (III)

wherein (SP) and R$^1$ are as defined above. [In formula (III) and the formulae given hereinbelow, only one silanol group is taken up, and a reaction at this part is described.]

The treated fine silica powder is subjected to an ordinary after-treatment such as washing with an alcohol, and drying, and then to a step of introducing the residue of the mono- or polyazoic dye represented by formulae (1) to (5). The introduction of the residue of the mono- or polyazoic dye will be described below in detail.

[I] Introduction of the group of the monoazo dye of formula (1)

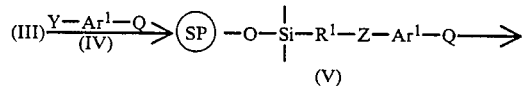

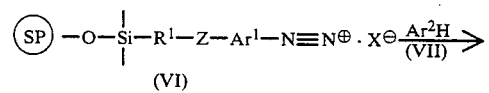

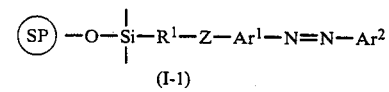

In the above formulae, (SP), R$^1$, Ar$^1$, Ar$^2$ and Z are as defined hereinabove; Y represents a functional group which reacts with the amino group; Q is bonded to a carbon atom on the aromatic ring other than carbon atoms adjacent to the carbon atom to which Y is bonded, and represents a hydrogen atom, a nitro group or a protected amino group; and X$^\ominus$ represents an anion such as Cl$^\ominus$, Br$^\ominus$ or BF$_4^\ominus$.

In the introduction of the monoazo dye residue of formula (1), the silica powder treated with the aminosilane coupling agent [formula (III)] is reacted with the compound of formula (IV).

In formula (IV), Y represents a functional group which reacts with the terminal amino group of the aminosilane coupling agent, and includes, for example,

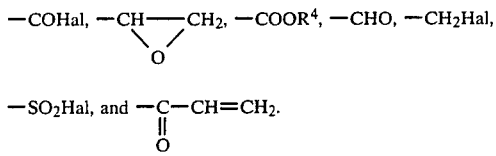

In these formulae, Hal represents a halogen atom such as Cl or Br; and $R^4$ represents a lower alkyl group such as methyl or ethyl.

On the other hand, Q is bonded to a carbon atom on the aromatic ring other than carbon atoms adjacent to the carbon atom to which the group Y is bonded (therefore, when $Ar^1$ represents a phenylene group which may be substituted, Q is meta or para to the group Y and represents a hydrogen atom, a nitro group or a protected amino group. Amino protecting groups which can be easily split off by hydrolysis may be used for protecting the amino group. Suitable protective groups are, for example, acyl groups such as acetyl, propionyl and benzoyl.

Specific examples of the compound of formula (IV) are shown below.

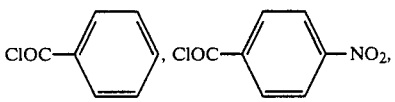

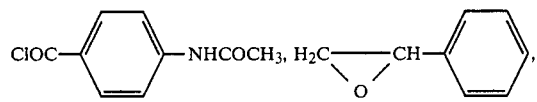

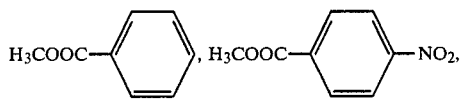

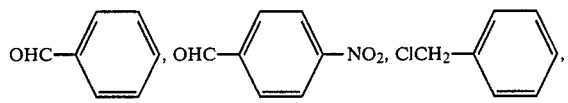

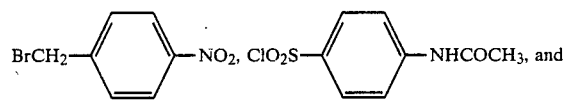

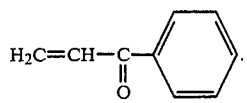

The reaction of the fine silica powder treated with the aminosilane coupling agent, with the compound of formula (IV) is generally carried out in a suitable organic solvent at room temperature to the refluxing temperature of the reaction mixture. Examples of the suitable organic solvent include alcohols such as methanol, ethanol and n-propanol, ethers such as diethyl ether and tetrahydrofuran, inert aromatic solvents such as benzene, toluene and xylene, ketones such as acetone, methyl ethyl ketone and diethyl ketone, dimethyl sulfoxide, N,N-dimethylformamide, sulfolane, hexamethylphosphoric triamide, acetonitrile, dichloromethane, chloroform, and carbon tetrachloride. Desirably, the reaction is carried out in the presence of a reaction promoter selected depending upon the type of the group Y in the compound of formula (IV). For example, when Y represents —COHal, —CH$_2$Hal or —SO$_2$Hal, the reaction is carried out desirably in the presence of an acid binder such as an amine (for example, a tertiary amine such as triethylamine or pyridine). When Y represents —COOR$^4$, the reaction is carried out advantageously in the presence of a base such as a sodium alkoxide.

The amount of the compound of formula (IV) relative to the fine silica powder treated with the aminosilane coupling agent can be varied widely depending upon the type of the aminosilane coupling agent and/or the type of the compound of formula (IV). Generally, at least 5 parts by weight, preferably 10 to 20 parts by weight, of the compound of formula (IV) is used per 100 parts by weight of the treated fine silica powder.

As a result, an intermediate represented by the following formula

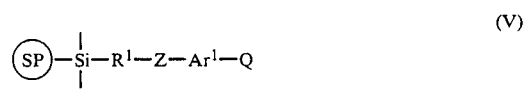

(V)

wherein SP, $R^1$, Z, $Ar^1$ and Q are as defined above, is obtained.

The intermediate is then converted to a diazonium salt represented by the following formula

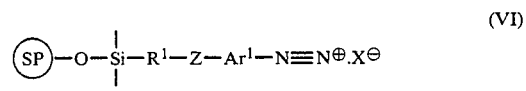

(VI)

wherein (SP), $R^1$, Z, $Ar^1$ and $X^\ominus$ are as defined hereinabove, (i) when Q represents a hydrogen atom, nitrating, reducing and diazotizing the intermediate of formula (V), (ii) when Q represents a nitro group, reducing and diazotizing the intermediate of formula (V), and (iii) when Q represents a protected amino group, deprotecting the intermediate of formula (V) and diazotizing it.

The unit reactions of nitration, reduction and diazotization are well known in the art, and can be carried out by methods known per se. Nitration can be carried out, for example, by the methods described in "New Experimental Chemistry Lecture", Vol. 14, [III], pages 1266–1286, edited by the Japanese Chemical Society and published on Oct. 1, 1978 by Maruzen Co., Ltd. and Kenzo Konishi and Nobuhiko Kuroki, "Chemistry of Synthetic Dyes", pages 27–37 published on Mar. 15, 1974 by Maki Shoten. Reduction can be carried out, for example, by the methods described at pages 1333–1341 of Vol. 14 of the "New Experimental Chemistry Lecture" cited above and pages 62 to 72 of the "Chemistry of Synthetic Dyes" cited above. Diazotization can be carried out, for example, by the methods described at pages 1565-1573 of Vol. 14 of the "New Experimental Chemistry Lecture" cited above and pages 145-149 of the "Chemistry of Synthetic Dyes" cited above.

The resulting diazonium salt is reacted with a coupler represented by the formula $Ar^2H$          (VII)

wherein $Ar^2$ is as defined above,
to obtain the azoic pigment of the invention having the monoazo dye residue of formula (1) introduced thereinto.

The coupling reaction can be carried out by methods known per se, for example the methods described at pages 1525-1528 of Vol. 14 of the "New Experimental Chemistry Lecture" cited above and pages 150-156 of the "Chemistry of Synthetic Dyes" cited above. For example, it can be carried out at a relatively low temperature of about 0° to about 10° C. under weakly alkaline conditions at a pH of about 7 to about 9 in a solvent such as water, an alcohol (e.g., as methanol or ethanol), dimethyl sulfoxide, N,N-dimethylformamide, or hexamethylphosphoric triamide.

The amount of the coupler used relative to the diazonium salt is not particularly limited. Generally, the coupler is used in an amount of 0.05 to 0.5 part by weight, preferably 0.2 to 0.3 part by weight, per 100 parts by weight of the diazonium salt.

The azoic pigment so obtained can be separated from the reaction mixture by filtration, centrifugation, etc., and then subjected to such treatments as acid treatment, washing with water, washing with acetone and drying.

[II] Introduction of the disazo dye residue of formula (2)

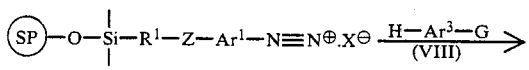

(VI)

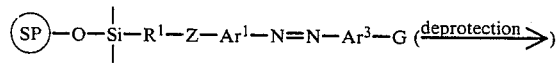

(IX)

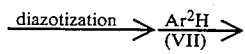

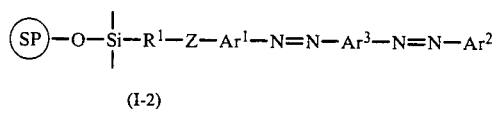

(I-2)

In the above formula, (SP), $R^1$, $Ar^1$, $Ar^2$, $Ar^3$ and Z are as defined hereinabove, and G represents an amino group which may be protected.

In introducing the disazo dye residue of formula (2) into the surface of the fine silica powder treated with the aminosilane coupling agent, the diazonium salt of formula (VI) produced as stated in section [II] above is reacted with an amino group-containing coupler of formula (VIII).

The amino group present in the coupler of formula (VIII) may be protected, if desired. The protective group may include those which can be easily split off by hydrolysis, for example acyl groups such as acetyl, propionyl and benzoyl. Examples of the amino group-containing coupler of formula (VIII) as shown below.

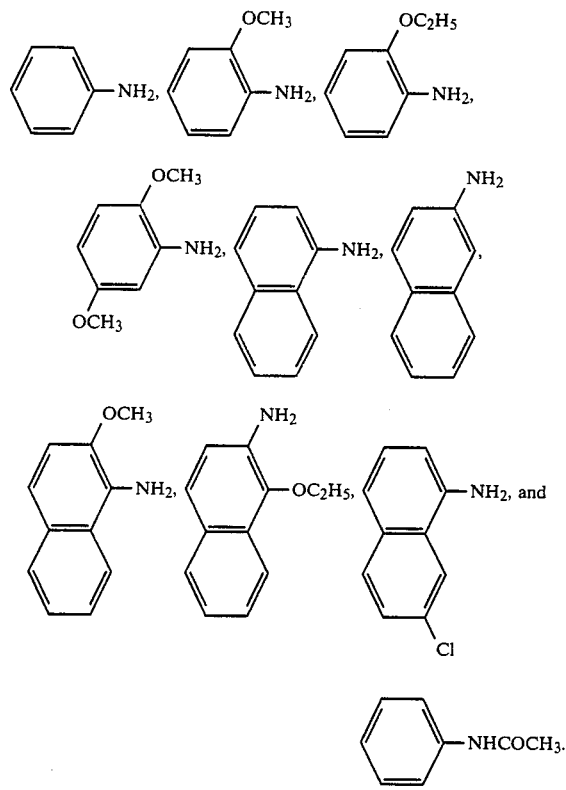

The reaction of the diazonium salt of formula (VI) with the amino-containing coupler of formula (VIII) can be carried out at a relatively low temperature of about 0° to about 10° C. under acidic conditions at a pH of about 5 to about 7 substantially in accordance with methods known per se, for example the methods described at pages 1525-1528 of Vol. 14 of the "New Experimental Chemistry Lecture" cited above and pages 150-156 of the "Chemistry of Synthetic Dyes" cited above. The amount of the amino-containing coupler of formula (VIII) used relative to the diazonium salt is not strictly limited, and can be varied over a broad range. Generally, 0.02 to 0.3 part by weight, preferably 0.1 to 0.2 part by weight, of the coupler of formula (VIII) can be used per 100 parts by weight of the diazonium salt.

The resulting compound of formula (IX) is subjected to diazotization of the amino group either directly (when G represents an amino group), or after the amino protecting group is split off by such a means as hydrolysis (when G represents a protected amino group). The diazotization can be carried out by methods known per se, for example the methods described in two cited publications indicated in section [I] with regard to the diazotization reaction.

The diazonium salt produced is reacted with the coupler of formula (VIII) in the same way as described in section [I] to introduce the disazo dye residue of formula (2) into the surface of the fine silica powder treated with the aminosilane coupling agent.

[III] Introduction of the monoazo dye group of formula (3)

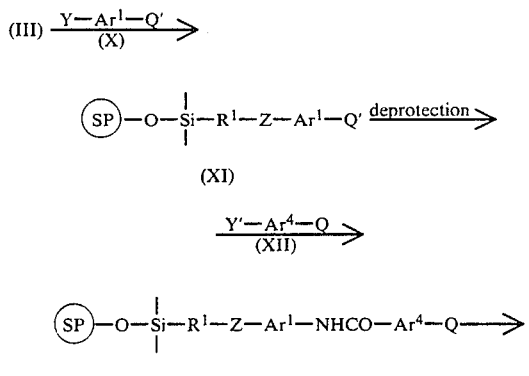

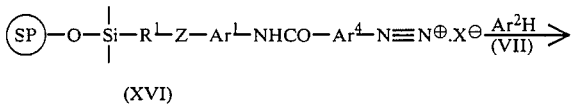

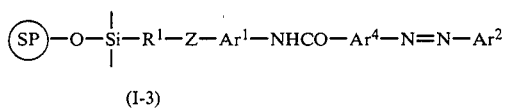

In the above formulae (SP), $R^1$, $Ar^2$, $Ar^4$, Q, $X^\ominus$ and Y are as defined hereinabove; Q' is bonded to a carbon atom on the aromatic ring other than carbon atoms adjacent to the carbon atom to which Y is bonded, and represents a protected amino group; and Y' represents —COHal or —COOR$^4$ in which Hal and $R^4$ are as defined hereinabove.

In introducing the monozo dye group of formula (3), the fine silica powder treated with the aminosilane coupling agent represented by formula (III) is reacted with a compound of formula (X) in the same way as described in section [I] with regard to the reaction of the fine silica powder with the compound of formula (IV). As a result, a substance represented by formula (XI) is formed. This substance of formula (XI) is then reacted with a compound of formula (XII) after the amino protecting group is split off by ordinary means such as hydrolysis. This reaction can also be carried out in the same way as described in [I] above with regard to the reaction of the substance of formula (III) with the compound of formula (IV). As a result, a substance represented by formula (XIII) is obtained. The substituent Q in this substance is converted to a diazonium salt in the manner described in section [I] to form a diazonium salt represented by formula (XIV). Reaction of the diazonium salt of formula (XIV) with the coupler of formula (VII) leads to the introduction of the monoazo dye residue of formula (3) into the surface of the fine silica powder treated with the aminosilane coupling agent [formula (I-3)].

[IV] Introduction of the azo dye groups of formulae (4) and (5)

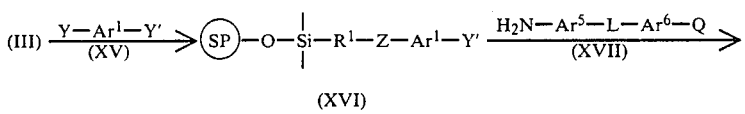

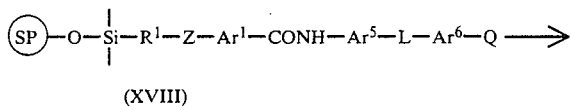

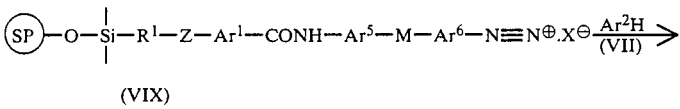

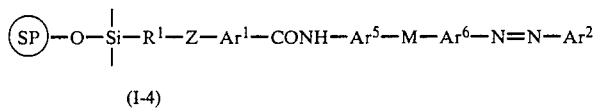

In the above formulae, (SP), $R^1$, $Ar^2$, $Ar^5$, $Ar^6$, Q, Y, Y' and Z are as defined hereinabove; L represents —N=N— or —NH; and M represents —N=N— or $$-\underset{NO}{N-}.$$

In introducing the azo dye group of formula (4) or (5), the fine silica powder treated with the aminosilane coupling agent represented by formula (III) is first reacted with a compound of formula (XV). This reaction can be carried out in the same way as described in section [I] above with regard to the reaction of the fine silica powder with the compound of formula (IV), whereby a substance represented by formula (XVI) is obtained.

The substance of formula (XVI) is then reacted with a compound of formula (XVII). Specific examples of the compound of formula (XVII) are shown below.

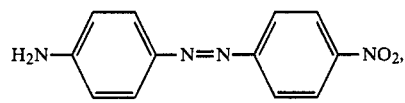

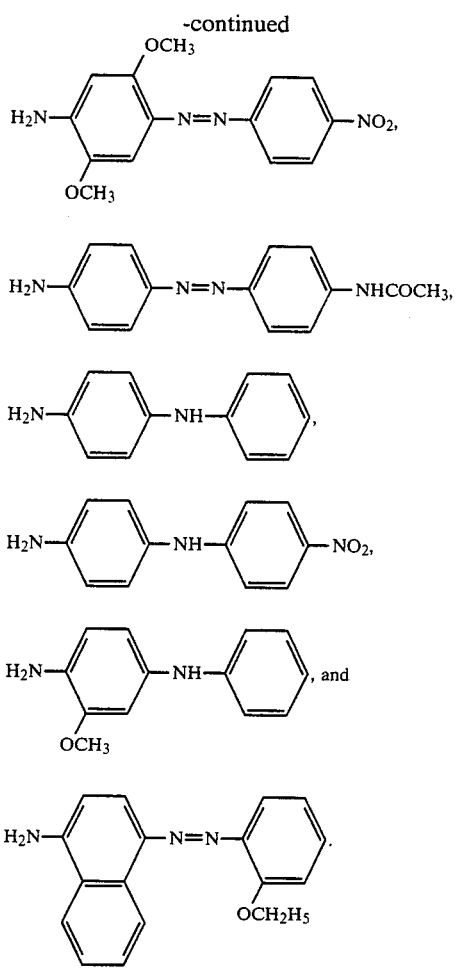

The reaction of the compounds of formula (XVII) with the substance of formula (XVI) can be carried out generally at a temperature of 15° to 90° C. in the presence of a base such as an amine (e.g., triethylamine or pyridine) or a sodium alkoxide in a suitable inert solvent. Examples of the solvent are ketones such as acetone, methyl ethyl ketone or diethyl ketone, ethers such as diethyl ether or tetrahydrofuran, and halogenated hydrocarbons such as dichloromethane, chloroform or carbon tetrachloride. The amount of the compound of formula (XVII) used relative to the substance of formula (XVI) is not particularly limited, and can be varied widely. Generally, about 0.05 to about 0.5 part by weight, preferably about 0.2 to about 0.3 part by weight, of the compound of formula (XVII) is conveniently used per 100 parts by weight of the substance of formula (XVI).

The substance of formula (XVIII) is reacted with the coupler of formula (VII) after the substituent Q in it is converted to a diazonium salt group. As a result, a compound of formula (I-4) having the diazo dye residue of formula (4) or (5) introduced thereinto. When L in formula (XVIII) is —NH—, this group changes to the group

during the diazotization reaction.

The above procedures give azoic pigments in which the mono- or polyazo dye residues have been introduced into at least 50%, preferably at least 70%, more preferably at least 80%, based on the total number of silanol groups on the surface of the fine silica powder, of silanol groups.

The above amounts of the mono- or polyazo dye residues introduced are tentative standards, and can be varied widely depending upon the desired degree of coloration of the final azoic pigments.

Typical examples of the azoic pigments of this invention which can be produced as above are shown below excepting the pigments specifically shown in the following Examples.

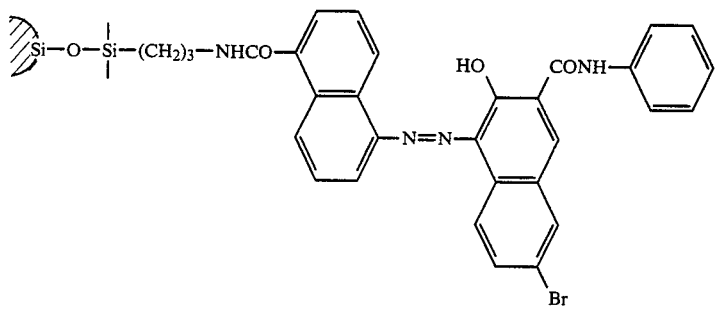

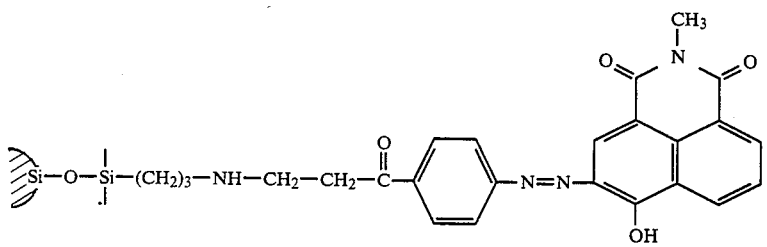

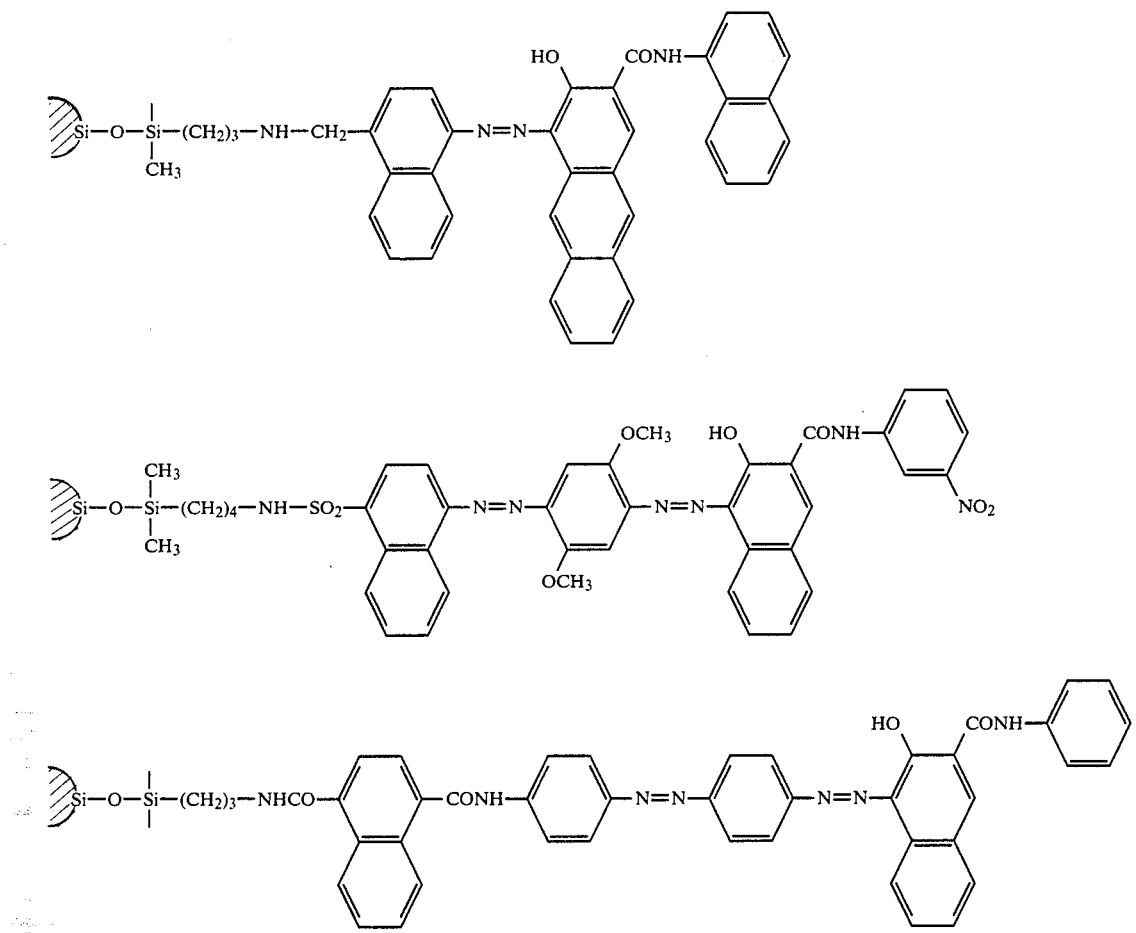

Since the azoic pigment provided by this invention contains finely divided silica having good transparency as a core, it has excellent transparency and is useful as a color material suitable for subtractive color mixing. It can be used, for example, in a natural color toner for electrophotographic recording materials.

The azoic pigments of this invention also have excellent solvent resistance, water resistance and fastness and a high color density, and therefore can be advantageously used as coloring agents for various paints.

In particular, since the azoic pigments provided by this invention have good self-charging property, excellent dispersibility in resins and excellent charge controlling ability, they are suitable as a coloring component of toners for electrophotography which do not require a charge controlling agent. If the azoic pigments are used as a coloring component, electrophotographic toners which give clear images free from fog and an edge effect can be prepared without particularly using a charge controlling agent. Furthermore, since the azoic pigments have excellent light permeability unlike conventional pigments, toners containing these pigments as coloring components can be subjected to subtractive color mixing by superimposing freely chosen colors, and can give color copies of natural colors having excellent color reproducibility of colors.

The electrophotographic color toner having these characteristics can basically be prepared by dispersing the azoic pigment of this invention in a resin medium for fixation in accordance with methods known per se.

There is no particular restriction on the resin medium for fixation used to disperse the azoic pigment therein. Ordinary electrically insulating resins which have previously been used as resin media for fixation of toners are also suitable in the present invention. Examples of the electrically insulating resins include thermoplastic resins such as polystyrene resins, polyalkylene resins, polyamide resins, polyester resins, polyvinyl acetal resin, acrylic resins, methacrylic resins and epoxy resins. These resins may be used singly or in combination with each other.

Suitable resins are homopolymers of various mono- or di-ethylenically unsaturated monomers, particularly vinyl aromatic monomers or acrylic monomers, and copolymers composed at least one of these monomers as a main component.

Examples of the vinyl aromatic monomers are monomers represented by the following formula

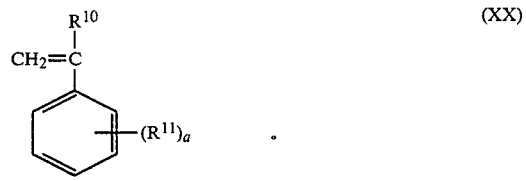

(XX)

wherein $R^{10}$ represents a hydrogen atom, a lower alkyl group, or a halogen atom, $R^{11}$ represents a substituent such as a lower alkyl group or a halogen atom, and a is 0, 1 or 2. Specific examples are styrene, vinyltoluene, α-methylstyrene, α-chlorostyrene, vinylxylene and vinylnaphthalene. Of these, styrene and vinyltoluene are preferred.

The acrylic monomers may, for example, be acrylic monomers represented by the following formula

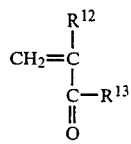

where $R^{12}$ represents a hydrogen atom or a lower alkyl group, and $R^{13}$ represents a hydroxyl, alkoxy, hydroxyalkoxy, amino or aminoalkoxy group. Specific examples include acrylic acid, methacrylic acid, ethyl acrylate, methyl methacrylate, butyl acrylate, butyl methacrylate, 2-ethylhexyl acrylate, 2-ethylhexyl methacrylate, 3-hydroxypropyl acrylate, 2-hydroxyethyl methacrylate, 3-aminopropyl acrylate, 3-N,N-diethylaminopropyl acrylate, and acrylamide.

Other monomers which can be copolymerized with these monomers include, for example, conjugated diolefin monomers represented by the following formula

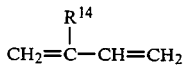

wherein $R^{14}$ represents a hydrogen atom, a
lower alkyl group or a chlorine atom, such as butadiene, isoprene and chloroprene; other ethylenically unsaturated carboxylic acids such as maleic anhydride, fumaric acid, crotonic acid and itaconic acid, and esters thereof; vinyl esters such as vinyl acetate; and other monomers such as vinylpyridine, vinylpyrrolidone, vinyl ethers, acrylonitrile, vinyl chloride and vinylidene chloride.

Typical examples of (co)polymers which are suitably used as media for fixation of toners are a styrene/methyl methacrylate copolymer, a styrene/ethyl methacrylate copolymer, a styrene/2-ethylhexyl acrylate and a styrene/butadiene copolymer.

The above resins may be used singly or as a blend of two or more. For use as a fixation medium, these resins desirably have a weight average molecular weight of generally 3,000 to 300,000, preferably 5,000 to 100,000, and advantageously have a glass transition temperature ($T_g$) of at least 45° C., preferably 50° to 150° C.

The proportion of the azoic pigment relative to the resin medium can be varied widely depending upon the type of the resin and/or the type of the pigment. Advantageously, the azoic dye is used in a proportion of generally 2 to 25 parts by weight, preferably 3 to 18 parts by weight, more preferably 5 to 15 parts by weight, per 100 parts by weight of the resin medium.

The toner in accordance with this invention does not particularly require the use of a charge controlling agent. If required, it is of course possible to incorporate the charge controlling agent into the toner. This can further increase the specific charge of the toner. Examples of useful charge controlling agents are metallic salts of higher fatty acids and metal-containing azo dyes. The charge controlling agent may be incorporated in a proportion of generally 0.05 part by weight, preferably 0.1 to 3 parts by weight, more preferably 0.2 to 2 parts by weight, per 100 parts by weight of the resin medium.

As required, the toner in accordance with this invention may include conventional auxiliary components, such as a filler (extender pigment), an offset-preventing agent (releasability-imparting agent) (particularly in the case of an electrophotographic toner adapted to be fixed by a hot roll), and a pressure fixability-imparting agent (in the case of an electrophotographic toner adapted to be fixed by a pressure roller).

Calcium carbonate, talc, etc. may be incorporated as the filler or extender pigment in an amount of up to 20% by weight based on the weight of the toner. Silicone oils, lower-molecular-weight olefinic resins, various waxes, etc. may be used as the offset preventing agent in an amount of 2 to 15% by weight based on the weight of the toner. The pressure fixability-imparting agent such as paraffin wax, various waxes of animal or vegetable origin, and fatty acid amides may be used in an amount of 5 to 30% by weight based on the weight of the toner.

In addition to the azoic pigment, the toner in accordance with this invention may contain another pigment, as required. For example one or more of other pigments may be incorporated in an amount of up to 5 parts by weight, preferably up to 2 parts by weight, per 100 parts by weight of the resin medium for fixation. The other pigments include for example black pigments such as carbon black, acetylene black, lamp black, and aniline black; yellow pigments such as Chrome Yellow, Zinc Yellow, Cadmium Yellow, Yellow Oxide of Iron, Mineral Fast Yellow, Nickel Titan Yellow, Naples Yellow, Naphthol Yellow S, Hansa Yellow G, Hansa Yellow 10G, Benzidine Yellow G, Benzidine Yellow GR, Quinoline Yellow Lake, Permanent Yellow NCG, and Tartrazine Lake; orange pigments such as Chrome Orange, Molybdate Orange, Permanent Orange GTR, Pyrazolone Orange, Vulcan Orange, Indanthrene Brilliant Orange RK, Benzidine Orange G and Indanthrene Brilliant Orange GK; red pigments such as Red Iron Oxide, Cadmium Red, Red Lead, Vermillion, Cadmium Red, Permanent Red 4R, Lithol Red, Pyrazolone Red, Watching Red Calcium Salt, Lake Red D, Brilliant Carmine 6B, Eosine Lake, Rhodamine Lake B, Alizarine Lake, and Brilliant Carmine 3B; violet pigments such as Manganese Violet, Fast Violet B and Methyl Violet Lake; blue pigments such as Ultramarine, Cobalt Blue, Alkali Blue Lake, Victoria Blue Lake, Phthalocyanine Blue, metal-free Phthalocyanine Blue, partially chlorinated Phthalocyanine Blue, Fast Sky Blue and Indanthrene Blue BC; green pigments such as Chrome Green, Chromium Oxide Green, Pigment Green B, Malachite Green Lake and Fanal Yellow Green G; and white pigments such as Zinc Oxide, Titanium Oxide, Antimony White and Zinc Sulfide.

The toner in accordance with this invention composed of the components described above can be produced by methods known per se. For example, the azoic pigment and the resin for fixation and optionally the other additives described above are mixed, and fully melt-kneaded by using a kneader, a pressure kneader, a roll mill, a twin-screw extruder, etc. The kneaded mixture is cooled, pulverized and optionally sieved. As required, in order to remove the corners of irregularly shaped particles, the pulverized toner may further be rapidly agitated mechanically.

The toner in accordance with this invention so produced may have an average particle diameter of generally 3 to 35 microns, preferably 5 to 20 microns.

The toner provided in this invention has various excellent properties to be described below, and can be widely used for preparing monochromatic copies or color copies by electrophotographic copying.

(i) The toner has excellent flowability and shows little tendency to blocking.

(ii) It is self-charging and itself has a negative charge. It is therefore suitable as a toner for a positively charged photosensitive material.

(iv) Since it has excellent light permeability, a halftone can be clearly reproduced by superimposition of colors.

(iv) Upon heat fixation, the surface of the toner becomes lustrous, and copies having a brilliant color can be obtained.

(v) Since the solvent-insoluble self-charging pigment is used as a coloring agent and a charge controlling agent, no bleeding or flowing occurs on the resulting copies even when the copies were wetted with water or alcohol.

In performing electrophotographic copying using the toner in accordance with this invention, a latent electrostatic image can be formed by any methods known per pe. For example, a photoconductive layer on an electrically conductive substrate is uniformly charged and exposed imagewise to form a latent electrostatic image.

The latent electrostatic image can be easily developed, for example, by mixing the toner with a magnetic carrier such as an iron powder, iron oxide powder, or ferrite powder, and contacting a magnetic brush of the toner with the substrate. The toner image formed by development is transferred to a copying paper, and then fixed by the heat of radiation in an oven or under flashing.

The following Examples illustrate the present invention more specifically.

[I] Preparation of Azoic Pigments

EXAMPLE 1

Pigment No. 1:

reaction, the reaction mixture was washed three times with chloroform, and dried (the resulting product is referred to as an "acylated sample A").

The acrylated sample A was added to 400 ml of a 1% aqueous solution of sodium dithionite, and the mixture was heated at 80° to 90° C. for 1 hour. After the reaction, the reaction mixture was washed with water three times, and dried (the resulting product is referred to as an "aminated sample A").

The aminated sample A was dispersed in 200 ml of 2N-aqueous HCl solution kept at 5° C., and with stirring, 40 ml of a 2M aqueous solution of sodium nitrite was added dropwise. At this time, care was taken not to have the temperature of the solution exceed 10° C., and in order to avoid light irradiation, the entire reactor was covered with an aluminum foil. After the reaction, the reaction mixture was washed with water once, and centrifuged (the product is referred to as a "diazotized sample A"), and without drying, used in the subsequent reaction.

4.7 g (0.015 mole) of 2-hydroxy-[N-(3-morpholinopropyl)]-3-naphthalinide was dissolved in 100 ml of N,N-dimethylformamide, and 50 ml of a 11% aqueous solution of sodium acetate was added to form a coupling solution. The coupling solution was cooled to 5° to 10° C. The diazotized sample A was dispersed in 100 ml of water, and gradually added to the coupling solution. After the reaction, the reaction mixture was left to stand for a while, and made weakly acidic (pH 5–6). It was then washed twice with water, once with N,N-dimethylformamide, and once with acetone in this sequence. After filtration, the filtrate was fully dried in a vacuum desiccator. As a result, 20.5 g of a reddish orange pigment (pigment No. 1) having the structure shown above was obtained.

(1) Appearance: reddish orange fine powder
(2) Characteristic absorption bands in infrared absorption spectra:

| Silane-coupled sample | |
|---|---|
| 2930 cm$^{-1}$ | $\nu$-CH$_2$— |
| 1560 cm$^{-1}$ | $\delta$NH$_2$ |
| 1470 cm$^{-1}$ | $\delta$-CH$_2$— |

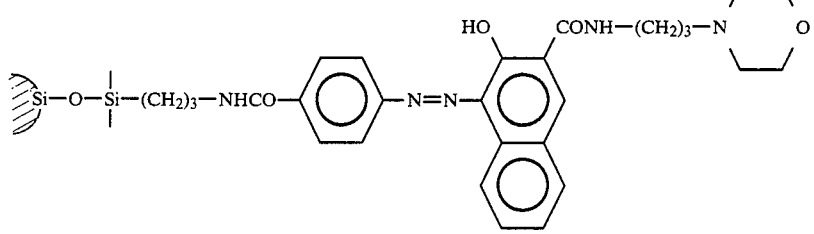

Twenty grams of silica gel (having a secondary particle diameter of about 1 micron) was dispersed in 200 g of a 10% aqueous solution of gamma-aminopropyltriethoxysilane, and the dispersion was heated with stirring at 80° to 90° C. for 16 hours. After the reaction, the reaction mixture was centrifuged and washed with water three times, and fully dried in a vacuum desiccator to obtain a treated silica (to be referred to as a "silane coupled sample").

The silane-coupled sample was put in 200 ml of a chloroform solution containing 2 g (0.01 mole) of p-nitrobenzoyl chloride and 1 g (0.01 mole) of triethylamine, and the mixture was refluxed for 1 hour. After the The absorption of $\delta$ Si-OH at 960 cm$^{-1}$ vanished.

| Acylated sample A | |
|---|---|
| 1640 cm$^{-1}$ | $\nu$ C=O |
| 1600 cm$^{-1}$ | $\nu$ C=C () |
| 1530 cm$^{-1}$ | $\nu$ as NO$_2$ |
| 1345 cm$^{-1}$ | $\nu$ s NO$_2$ |

-continued

Aminated sample A
1630 cm$^{-1}$   δ N—H
Pigment No. 1
1640 cm$^{-1}$   ν C=O 1640 cm$^{-1}$ ⎫
1450 cm$^{-1}$ ⎬ ν C=C 

EXAMPLE 2

The pigments shown in Table 1 were produced by repating the procedure of Example 1 except that the corresponding starting materials were used.

TABLE 1

| Pigment No. | Structural formula | Color |
| --- | --- | --- |
| 2 | ≡Si—O—Si(CH₂)₃NHCO—C₆H₄—N=N—(naphthol with HO, CONH—C₆H₅) | Reddish orange |
| 3 | ≡Si—O—Si(CH₂)₃NHCO—C₆H₄—N=N—(naphthol with HO, CONH—2,4-(CH₃)₂C₆H₃) | Reddish orange |
| 4 | ≡Si—O—Si(CH₂)₃NHCO—C₆H₄—N=N—(naphthol with HO, CONH—C₆H₄—OCH₃, and NH-indole substituent) | Violet |
| 5 | ≡Si—O—Si(CH₂)₃NHCO—C₆H₄—N=N—(naphthol with HO, CONH—C₆H₄—Cl) | Reddish orange |

TABLE 1-continued

| Pigment No. | Structural formula | Color |
|---|---|---|
| 6 | Si—O—Si(CH$_2$)$_3$NHCO—C$_6$H$_4$—N=N—(2-hydroxy-3-naphthoyl)—NH—C$_6$H$_4$—OC$_2$H$_5$ | Reddish orange |
| 7 | Si—O—Si(CH$_2$)$_3$NHCO—C$_6$H$_4$—N=N—(2-hydroxy-3-naphthoyl)—NH—C$_6$H$_4$—CH$_3$ | Reddish orange |
| 8 | Si—O—Si(CH$_2$)$_3$NHCO—C$_6$H$_{10}$—N=N—(2-hydroxy-3-naphthoyl)—NH—C$_6$H$_4$—OCH$_3$ | Reddish orange |
| 9 | Si—O—Si(CH$_2$)$_3$NHCO—C$_6$H$_4$—N=N—(2-hydroxy-3-naphthoyl)—NH—C$_6$H$_4$—OC$_2$H$_5$ | Reddish orange |
| 10 | Si—O—Si(CH$_2$)$_3$NHCO—C$_6$H$_4$—N=N—(2-hydroxy-3-naphthoyl)—NH—C$_6$H$_4$—NO$_2$ | Reddish orange |

TABLE 1-continued
| Pigment No. | Structural formula | Color |
|---|---|---|
| 11 | 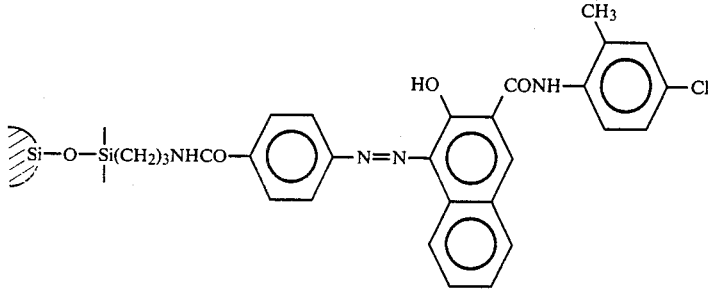 | Reddish orange |
| 12 | 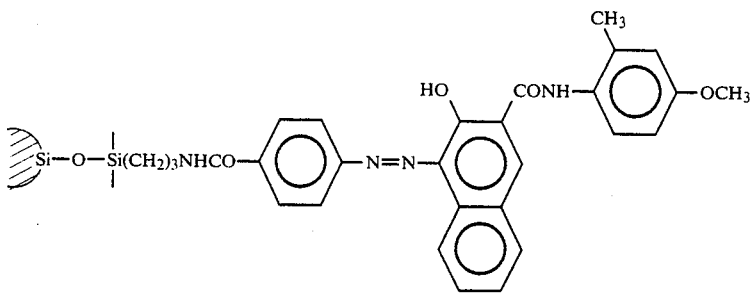 | Reddish orange |
| 13 | 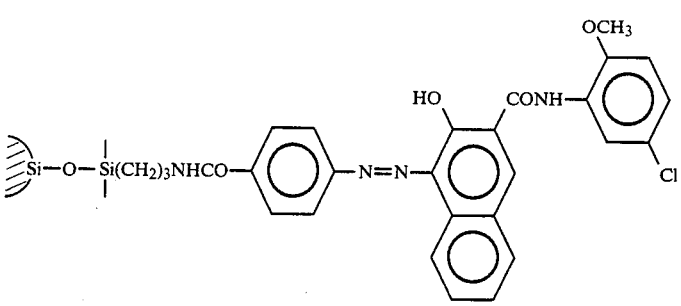 | Reddish orange |
| 14 | 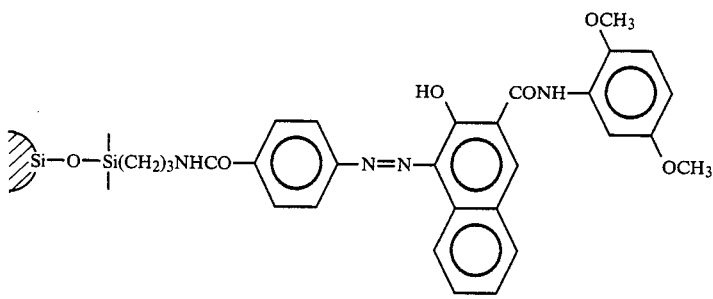 | Reddish orange |
| 15 | 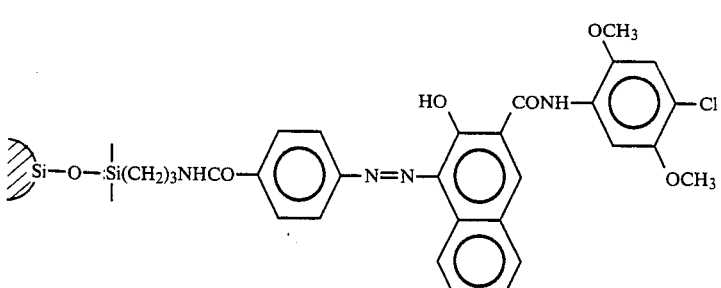 | Reddish orange |

TABLE 1-continued

| Pigment No. | Structural formula | Color |
|---|---|---|
| 16 | Si—O—Si(CH$_2$)$_3$NHCO—C$_6$H$_4$—N=N—(naphthol with HO, CONH-(2,4-dimethoxy-5-chlorophenyl)) | Reddish orange |
| 17 | Si—O—Si(CH$_2$)$_3$NHCO—C$_6$H$_4$—N=N—(naphthol with HO, CONH-naphthyl) | Reddish orange |
| 18 | Si—O—Si(CH$_2$)$_3$NHCO—C$_6$H$_4$—N=N—(naphthol with HO, CONH-naphthyl) | Reddish orange |
| 19 | Si—O—Si(CH$_2$)$_3$NHCO—C$_6$H$_4$—N=N—(naphthol with HO, CONH-(2-methyl-4-methoxyphenyl), fused indole NH) | Violet |
| 20 | Si—O—Si(CH$_2$)$_3$NHCO—C$_6$H$_4$—N=N—(naphthol with HO, CONH-(4-chlorophenyl), HN-phenyl) | Brown |

TABLE 1-continued

| Pigment No. | Structural formula | Color |
| --- | --- | --- |
| 21 | | Red |
| 22 | | Yellow |
| 23 | | Yellow |
| 24 | | Reddish orange |
| 25 | | Reddish orange |
| 26 | | Violet |

TABLE 1-continued

| Pigment No. | Structural formula | Color |
|---|---|---|
| 27 | Si—O—SiC$_3$H$_6$NHCH$_2$CH(OH)—C$_6$H$_4$—N=N—[3-hydroxy-2-(morpholinopropylcarbamoyl)naphthalen-1-yl] | Reddish orange |
| 28 | Si—O—SiC$_3$H$_6$NHCH$_2$CH(OH)—C$_6$H$_4$—N=N—[3-hydroxy-2-(3-nitrophenylcarbamoyl)naphthalen-1-yl] | Reddish orange |
| 29 | Si—O—SiC$_3$H$_6$NHCH$_2$—C$_6$H$_4$—N=N—[3-hydroxy-2-(morpholinopropylcarbamoyl)naphthalen-1-yl] | Reddish orange |
| 30 | Si—O—SiC$_3$H$_6$NHCH$_2$—C$_6$H$_4$—N=N—[3-hydroxy-2-(3-nitrophenylcarbamoyl)naphthalen-1-yl] | Reddish orange |
| 31 | Si—O—SiC$_3$H$_6$N=CH—C$_6$H$_4$—N=N—[3-hydroxy-2-(morpholinopropylcarbamoyl)naphthalen-1-yl] | Crimson |
| 32 | Si—O—SiC$_3$H$_6$N=CH—C$_6$H$_4$—N=N—[3-hydroxy-2-(3-nitrophenylcarbamoyl)naphthalen-1-yl] | Crimson |

TABLE 1-continued

| Pigment No. | Structural formula | Color |
|---|---|---|
| 33 | ≡Si—O—Si(CH₃)(C₃H₆NHC₂H₄NHCO)—C₆H₄—N=N—[2-hydroxy-3-(CONHC₃H₆N-morpholino)naphthyl] | Reddish orange |
| 34 | ≡Si—O—Si(CH₃)(C₃H₆NHC₂H₄NHCO)—C₆H₄—N=N—[2-hydroxy-3-(CONH-3-nitrophenyl)naphthyl] | Reddish orange |
| 35 | ≡Si—O—Si(CH₃)(C₃H₆NHC₂H₄NHCO)—C₆H₄—N=N—[2-hydroxy-3-(CONH-4-methoxyphenyl)-4-(2-methylphenylamino)naphthyl] | Violet |
| 36 | ≡Si—O—Si(C₃H₆NHCONHCO)—C₆H₄—N=N—[2-hydroxy-3-(CONHC₃H₆N-morpholino)naphthyl] | Reddish orange |
| 37 | ≡Si—O—Si(C₃H₆NHCONHCO)—C₆H₄—N=N—[2-hydroxy-3-(CONH-3-nitrophenyl)naphthyl] | Reddish orange |

TABLE 1-continued

| Pigment No. | Structural formula | Color |
|---|---|---|
| 38 | 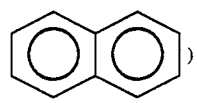 | Violet |

The characteristic absorption bands of the pigments Nos. 24, 27, 29, 31, 33 and 36 in their infrared absorption spectra were as follows:

Pigment No. 24
1650 cm$^{-1}$    ν C=O 1600 cm$^{-1}$ } ν C=C ( naphthalene )
1450 cm$^{-1}$ 1320 cm$^{-1}$    ν —S(=O)(=O)—

Pigment No. 27
1650 cm$^{-1}$    ν C=O 1600 cm$^{-1}$ } ν C=C ( naphthalene )
1450 cm$^{-1}$

Pigment No. 29
1650 cm$^{-1}$    ν C=O 1600 cm$^{-1}$ } ν C=C ( naphthalene )
1450 cm$^{-1}$

Pigment No. 31
1650 cm$^{-1}$    ν C=O

1650–40 cm$^{-1}$    ν C=N 1600 cm$^{-1}$ } ν C=C ( naphthalene )
1450 cm$^{-1}$

Pigment No. 33
1650 cm$^{-1}$    ν C=O 1600 cm$^{-1}$ } ν C=C ( naphthalene )
1450 cm$^{-1}$

Pigment No. 36
1650 cm$^{-1}$    C=O 1600 cm$^{-1}$ } ν C=C ( naphthalene )
1450 cm$^{-1}$

EXAMPLE 3

Pigment No. 39:

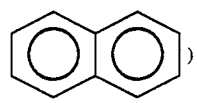

Twenty grams of the diazotized sample A described in [I] above was dispersed in 100 ml of water to form a diazotized solution. 1.5 g (0.01 mole) of 2,5-dimethoxyaniline was dissolved in 1N hydrochloric acid, and a 11% aqueous solution of sodium acetate was added to adjust the pH of the solution to 5, and the solution was cooled to 5° to 10° C. The diazotized solution was gradually added to the cooled solution. After the reaction, the reaction mixture was left to stand for a while, and subjected to filtration, washing with acetone and washing with water. The product was used in the subsequent reaction without drying.

200 ml of 2N aqueous HCl solution was maintained at 5° C., and the product obtained above was dispersed in the aqueous HCl solution, and with stirring, 40 ml of a 2N aqueous solution of sodium nitrite was added dropwise. At this time, care was taken not to have the temperature of the solution exceed 10° C., and in order to avoid light irradiation, the entire reactor was wrapped with an aluminum foil. After the reaction, the reaction mixture was washed once with water, and centrifuged. The product (to be referred to as a "diazotized sample B") was used in the subsequent reaction without drying.

5.7 g (0.015 mole) of 2-hydroxy-11H-benzo(d)carbazole-3-carboxy-p-anisidide was dissolved in 100 ml of N,N-dimethylformamide, and 50 ml of a 11% aqueous solution of sodium acetate was added to form a coupling solution. The solution was then cooled to 5° to 10° C. The diazotized sample B was dispersed in 100 ml of water, and the dispersion was gradually added to the coupling solution. After the reaction, the reaction mixture was left to stand for a while, and made weakly acidic (pH 5–6). The reaction mixture was washed twice with water, once with N,N-dimethylformamide, and once with acetone in this sequence, separated by filtration, and fully dried in a vacuum desiccator. As a result, 18.9 g of a bluish black pigment (pigment No. 39) having the structure shown above was obtained.

The resulting pigment showed the following characteristic absorption bands in its infrared absorption spectrum.

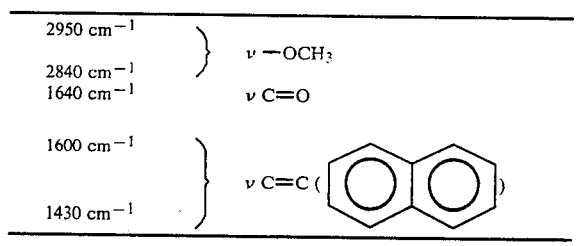

EXAMPLE 4

The pigments shown in Table 2 were produced by repeating the procedure of Example 3 except that the corresponding starting materials were used.

TABLE 2

| Pigment No. | Structural formula | Color |
|---|---|---|
| 40 | Si—O—Si(CH$_2$)$_3$NHCO—C$_6$H$_4$—N=N—(naphthalene)—N=N—(naphthalene with H, CONH(CH$_2$)$_3$N-morpholine) | Reddish brown |
| 41 | Si—O—Si(CH$_2$)$_3$NHCO—C$_6$H$_4$—N=N—(naphthalene)—N=N—(naphthalene with H, CONH-naphthyl) | Violet |
| 42 | Si—O—Si(CH$_2$)$_3$NHCO—C$_6$H$_4$—N=N—(naphthalene)—N=N—(benzocarbazole with H, CONH—C$_6$H$_4$—OCH$_3$) | Deep green |

TABLE 2-continued

| Pigment No. | Structural formula | Color |
|---|---|---|
| 43 | | Violet |
| 44 | | Violet |
| 45 | | Black |
| 46 | | Violet |
| 47 | | Violet |

TABLE 2-continued

| Pigment No. | Structural formula | Color |
|---|---|---|
| 48 | 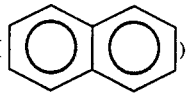 | Violet |
| 49 | | Dark brown |
| 50 | | Deep green |

The pigments Nos. 40 and 43 had the following characteristic absorption bands in their infrared absorption spectra.

| Pigment No. 40 | |
|---|---|
| 1640 cm$^{-1}$ | $\nu$C=O |
| 1610 cm$^{-1}$ | $\nu$C=C (naphthalene) |
| 1450 cm$^{-1}$ | |
| Pigment No. 43 | |
| 1650 cm$^{-1}$ | $\nu$C=O |
| 1440 cm$^{-1}$ | $\nu$C=C (naphthalene) |

EXAMPLE 5

Pigment No. 51:

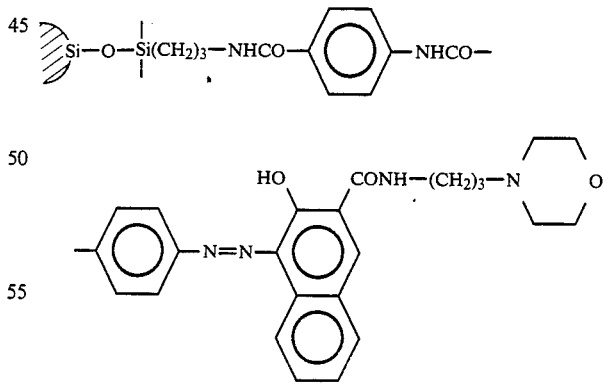

The aminated sample A described in [I] was put in 200 ml of a chloroform solution containing 2 g (0.01 mole) of p-nitrobenzoyl chloride and 1 g (0.01 mole) of triethylamine, and the mixture was refluxed for 1 hour. After the reaction, the reaction mixture was washed three times with chloroform, and dried (the product is referred to as an "acylated sample B").

The acylated sample B was added to 400 ml of a 1% aqueous solution of sodium dithionite, and heated at 80° to 90° C. for 1 hour. After the reaction, the reaction mixture was washed three times with water and dried (the product is referred to as an "aminated sample C").

Two hundred milliliters of 2N HCl was maintained at 5° C., and the aminated sample C was dispersed in it. With stirring, 40 ml of a 2N aqueous solution of sodium nitrite was added dropwise. At this time, care was taken not to have the temperature of the solution exceed 10° C., and in order to avoid light irradiation, the entire reactor was wrapped with an aluminum foil. After the reaction, the reaction mixture was washed once with water, and centrifuged. Without drying it was used directly in the subsequent reaction (the product is referred to as a "diazotized sample C").

4.7 g (0.015 mole) of 2-hydroxy-[N-(3-morpholinopropyl)]-3-naphthalinide was dissolved in 100 ml of N,N-dimethylformamide, and 50 ml of a 11% aqueous solution of sodium acetate was added to form a coupling solution. The coupling solution was cooled to 5° to 10° C. The diazotized sample C was dispersed in 100 ml of water, and the dispersion was gradually added to the coupling solution. After the reaction, the raction mixture was left to stand for a while, and made weakly ascidic (pH 5-6). It was then washed twice with water, once with N,N-dimethylformamide and once with acetone in this sequence, filtered, and fully dried in a vacuum desiccator. As a result, 19.2 g of a reddish orange pigment (pigment No. 51) having the structure shown above was obtained. It had the following characteristic absorption bands in its infrared absorption spectrum.

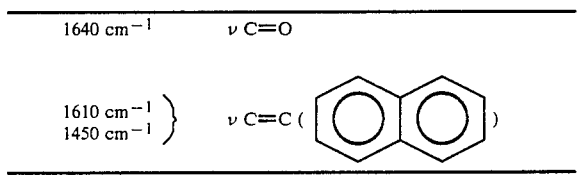

EXAMPLE 6

The pigments shown in Table 3 were produced by repeating the procedure of Example 5 except that the corresponding starting materials were used.

TABLE 3

| Pigment No. | Structural formula | Color |
|---|---|---|
| 52 | | Violet |
| 53 | | Reddish orange |
| 54 | | Yellow |
| 55 | | Reddish orange |

TABLE 3-continued

| Pigment No. | Structural formula | Color |
|---|---|---|
| 56 | 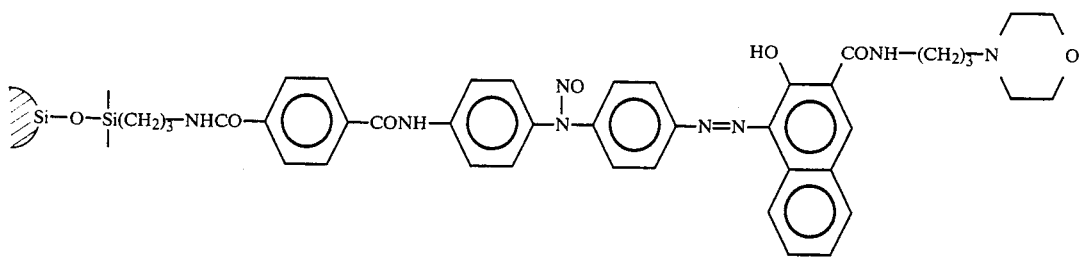 | Violet |

EXAMPLE 7

Pigment No. 57:

The silane-coupled sample described in section [I] above, 2 g (0.01 mole) of terephthaloyl chloride and 1 g (0.01 mole) of triethylamine were added to 200 ml of a chloroform solution, and the mixture was refluxed for 1 hour. Then, 1.8 g (0.01 mole) of 4-aminodiphenylamine and 1.5 g (0.015 mole) of triethylamine were added. The mixture was further refluxed for 1 hour. After the reaction, the reaction mixture was washed three times with chloroform and then dried.

The resulting product was put in 150 ml of sulfuric-nitric mixed acid (1:1) and reacted at about 60° C. for 20 minutes to perform nitration. After the reaction, the reaction mixture was washed with water until it became neutral.

Subsequently, the nitrated product was added to 400 ml of a 1% aqueous solution of sodium dithionite, and heated at 80° to 90° C. for 1 hour. After the reaction, the reaction mixture was washed three times with water, and dried.

Two hundred milliliters of 2N aqueous solution of HCl was maintaind at 5° C., and 40 ml of a 2N aqueous solution of sodium nitrite was added dropwise with stirring. At this time, care was taken not to have the temperature of the solution exceed 10° C., and in order to avoid light irradiation, the entire reactor was wrapped with an aluminum foil. After the reaction, the reaction mixture was washed once with water, and centrifuged. Without drying, the product was directly used in the subsequent reaction (the product is referred to as a "diazotized sample D").

4.7 g (0.015 mole) of 2-hydroxy-[N-(3-morpholinopropyl)]-3-naphthalinide was dissolved in 100 ml of N,N-dimethylformamide, and 50 ml of a 11% aqueous solution of sodium acetate was added to form a coupling solution. The coupling solution was cooled to 5° to 10° C. The diazotized sample D was dispersed in 100 ml of water, and the dispersion was gradually added to the coupling solution. After the reaction, the reaction mixture was left to stand for a while, and made weakly acidic (pH 5-6). It was washed twice with water, once with N,N-dimethylformamide and once with acetone in this sequence, filtered, and fully dried in a vacuum desiccator to give 16.8 g of a lavender-colored pigment (pigment No. 57) having the structure shown above. The pigment showed the following characteristic absorption bands in its infrared absorption spectrum.

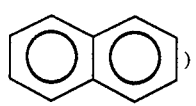

EXAMPLE 8

The pigments shown in Table 4 were produced by repeating the procedure of Example 7 except that the corresponding starting materials were used.

TABLE 4

| Pigment No. | Structural formula | Color |
|---|---|---|
| 58 | Si—O—Si(CH₂)₃NHCO—C₆H₄—CONH—C₆H₄—N=N—C₆H₄—N=N—(naphthol: HO, CONH(CH₂)₃N-morpholine) | Crimson |
| 59 | Si—O—Si(CH₂)₃NHCO—C₆H₄—CONH—C₆H₄—N=N—C₆H₄—N=N—(naphthol: HO, CONH—C₆H₅) | Crimson |
| 60 | Si—O—Si(CH₂)₃NHCO—C₆H₄—CONH—C₆H₄—N=N—C₆H₄—N=N—(naphthol: HO, CONH—C₆H₄—NO₂) | Crimson |
| 61 | Si—O—Si(CH₂)₃NHCO—C₆H₄—CONH—C₆H₄—N=N—C₆H₄—N=N—(naphthol: HO, CONH—C₆H₄—OCH₃; indole-NH fused) | Gray |
| 62 | Si—O—Si(CH₂)₃NHCO—C₆H₄—CONH—C₆H₄—N(NO)—C₆H₄—N=N—(naphthol: HO, CONH—C₆H₄—OC₂H₅) | Lavender |
| 63 | Si—O—Si(CH₂)₃NHCO—C₆H₄—CONH—C₆H₄—N(NO)—C₆H₄—N=N—(naphthol: HO, CONH—C₆H₄—NO₂) | Lavender |
| 64 | Si—O—Si(CH₂)₃NHCO—C₆H₄—CONH—C₆H₄—N(NO)—C₆H₄—N=N—(naphthol: HO, CONH—C₆H₄—OCH₃; indole-NH fused) | Gray |

Pigment No. 58 showed the following characteristic absorption bands in its infrared absorption spectrum.

| | |
|---|---|
| 1630 cm⁻¹ | ν C=O |
| 1440 cm⁻¹ | ν C=C (naphthalene) |

REFERENTIAL EXAMPLE 1

Measurement of light permeability:

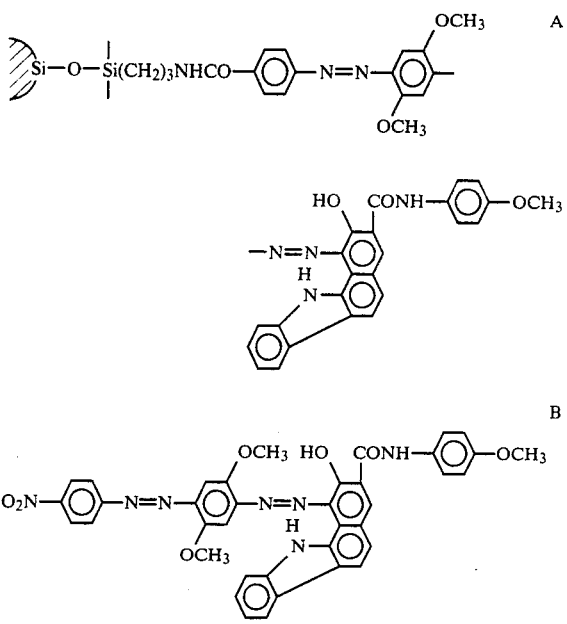

An azoic pigment A having a silica core (pigment No. 35) and an organic disazo pigment B having a similar chemical structure as shown above were dispersed in a solution of Vylon 200 (a tradename for a polyester resin made by Toyo Boseki Co., Ltd.) in tetrahydrofuran (THF) in accordance with the following recipes. The dispersions were coated on Tetoron (polyester) films having a thickness of 50 microns by using several types of wire bars.

|  | Recipe I | Recipe II |
|---|---|---|
| Pigment | 1 part by weight | 1 part by weight |
| Vylon 200 | 10 parts by weight | 20 parts by weight |
| THF | 100 parts by weight | 200 parts by weight |

Coated films having the same coating thickness and recipe were used as samples for a comparative study of the pigments A and B. The light transmission densities of these samples were measured by using a densitometer (Sakura Densitometer Model PDA-65 made by Konishiroku Shashin Kogyo K.K.). The results are shown in Table 5.

TABLE 5

| Run No. | Recipe for sample preparation | Thickness of the coating (microns) | Transmission density of pigment A (*) | Transmission density of pigment B (*) |
|---|---|---|---|---|
| 1 | I | 2.0 | 0.10 | 0.58 |
| 2 | I | 3.0 | 0.14 | 0.73 |
| 3 | II | 3.0 | 0.14 | 0.40 |

(*): The inverse logarithm of the transmittance of light.

Table 5 demonstrates that the pigment A evidently has higher transparency.

The percent transmission of visible light of the two coated films of Run No. 3 in Table 5 were measured by a double beam spectrophotometer (Model 124 made by Hitachi Limited), and the results are shown in Table 6.

TABLE 6

| Wavelength (nm) | Transmission (% T) A | Transmission (% T) B |
|---|---|---|
| 400 | 66 | 48 |
| 450 | 71 | 42 |
| 500 | 72 | 38 |
| 550 | 69 | 30 |
| 600 | 68 | 25 |
| 650 | 65 | 24 |
| 700 | 70 | 25 |

It is seen from Table 6 that the pigment A has a higher percent transmission.

REFERENTIAL EXAMPLE 2

Test for water resistance and solvent resistance:

Each of the azo pigment having a silica core and the organic disazo pigment B having a similar structure was dispersed in each of water, acetone, toluene, N,N-dimethylformamide, diethyl ether and methanol, and the dispersion was stirred for 3 hours. It was then centrifuged, and the degree of coloration of the supernatant liquid was examined. The results are shown in Table 7.

TABLE 7

| Water or solvent | Supernatant liquid containing pigment A | Supernatant liquid containing pigment B |
|---|---|---|
| Water | transparent | lightly colored |
| Acetone | transparent | deeply colored |
| Toluene | transparent | lightly colored |
| N,N—dimethylformamide | lightly colored | fairly strongly colored |
| Diethyl ether | transparent | lightly colored |
| Methanol | transparent | lightly colored |

It is seen from Table 7 that the azoic pigment A having a silica core has much higher water resistance and solvent resistance.

REFERENTIAL EXAMPLE 3

Heat resistance test:

Each of the azoic pigment A having a silica core and the organic pigment B having a similar structure was heated to 200° C., and then cooled to room temperature. On examination, it was found that the pigment A still retained the properties of a pigment, but carbonization proceeded in the pigment B and it lost the properties of a pigment. It is clear therefore that the azoic pigment A has excellent heat resistance. [II] Preparation of toners

Example A

A mixture of 270 parts by weight (to be referred to simply as parts hereinafter) of a styrene-acrylic acid copolymer having a weight-average molecular weight of 83,000 and 30 parts of pigment No. 1 prepared in Example 1, and a mixture of 270 parts of the above copolymer, 24 parts of a red azo pigment (Fast Red 2BE made by Sanyo Shikiso K.K.) and 6 parts of a negative charge controlling agent (SPILON RED GR 1H made by Hodogaya Chemical Co., Ltd.) were each melt-kneaded at 140° C. by a two-roll mill. When 5, 10, 20 and 40 minutes elapsed respectively from the start of the kneading, the kneaded mixture was partly sampled. The samples were each cooled, coarsely pulverized by a cutting mill, finely pulverized by a jet mill and then classified by a zig-zag classifier to obtain toners of a red color having a particle diameter distributed from 5 to 25 microns.

To examine the specific charges of these toners, 95 parts of an iron powder carrier (200/300 mesh made by Japan Iron Powder Co., Ltd.) and 5 parts each of the toners were mixed for 10 minutes in a plastic container to prepare a developer. A part of the developer was taken, and subjected to a commecially available blow-off charge measuring device (made by Toshiba Chemical Co., Ltd.) to measure its specific charge (g/m, μc/g). The results are shown in FIG. 1.

FIG. 1 shows that the specific charge of the toner in accordance with this invention (solid line) nearly reached saturation as a result of kneading only for 10 minutes, and this indicates that the kneading and dispersion were carried out fully. In contrast, in the comparative toner (broken line), the pigment was not fully dispersed unless it was kneaded for 40 minutes which is four times as long, and its specific charge did not become sufficiently high. This is because the toner in accordance with this invention contains the particulate self-charged azoic pigment. Hence, the toner in accordance with this invention has very good dispersibility and charge controllability.

Example B

Each of pigment No. 22 prepared in Example 2 and pigment No. 58 prepared in Example 8 was melt-kneaded in the same way as in Example A for 10 minutes, cooled and classified. Thus, a yellow toner and a magenta toner were prepared. Ten parts of each of the toners was mixed with 90 parts of an iron powder carrier to prepare a developer.

A selenium photosensitive material was charged to +650 V, exposed imagewise through a document, and developed and transferred to a high quality paper having a thickness of 80 microns by each of the following four procedures. The transferred toner images were each fixed in an oven.

(1) Development with the yellow toner, followed by transferring.

(2) Development with the magenta toner, followed by transferring.

(3) Development with the yellow toner, followed by transferring, and subsequently the magenta toner was developed and then transferred onto the yellow toner image.

(4) Development with the magenta toner, followed by transferring. Subsequently, the yellow toner was developed and then transferred onto the magenta toner image.

After fixation, the chromaiticities of the fixed images were evaluated in accordance with the CIE chromaticity diagram using a commercial color difference meter (Color Ace Model TCA-1 made by Tokyo Denshoku K.K.). The results are shown in Table 8.

TABLE 8

| Procedure | x | y |
|---|---|---|
| (1) | 0.43 | 0.46 |
| (2) | 0.37 | 0.37 |
| (3) | 0.52 | 0.30 |
| (4) | 0.53 | 0.30 |

The above results show that irrespective of the development-transferring procedures [(3) or (4)] of the yellow toner and the magenta toner, the toner images obtained by color superimposition show the same orange color. As is clear from this, since the toners in accordance with this invention are composed of fine particles of pigments having excellent light transmission, even when a color is superimposed, the color under it is not hidden. Thus, even when the toner is used as a color toner for so-called subtractive color mixing, the color of the document can be reproduced faithfully in natural color shades.

When the comparative toner in Example A was developed and transferred to the toner image (yellow) developed and transferred by procedure (1), and fixed, it did not become orange but became red (x: 0.58, y: 0.33). However, when the yellow toner in accordance with this invention was developed, and the toner image was then transferred onto this toner image (red) for comparison and fixed, an image of brilliant orange (x: 0.57, y: 0.37) was obtained.

Example C

Black toners were prepared by using pigment No. 45 of Example 4 in the same way as in Example A except that the ratio of the pigment to the resin was adjusted to 3/97, 5/95, 10/90, 15/85 and 20/80.

Each of the toner was mixed in an amount of 9% with an iron powder carrier to prepare a developer. A selenium photosensitive material was charged, exposed imagewise through a test chart No. 1-R of the Japanese Society of Electrophotography. The latent electrostatic image was developed with the developer, transferred and fixed. The reflection density of the solid black portion and the specific charge of each of the developers were measured. The results are shown in Table 9.

TABLE 9

| Pigment/resin ratio | Reflection density | Specific charge of the toner |
|---|---|---|
| 3/97 | 0.77 | −10.3 μc/g |
| 5/95 | 0.93 | −13.1 |
| 10/90 | 1.23 | −15.2 |
| 15/85 | 1.30 | −16.1 |
| 20/80 | 1.31 | −14.0 |

When the ratio of the pigment to the resin is less than 3/97, the concentration of the pigment is too low and the image density becomes low. If, on the other hand, the pigment/resin ratio is higher than 20/80, the specific volume of the pigment is large for the volume of the resin, and the operation of kneading them tends to become difficult. Moreover, the image density reaches saturation. Accordingly, in the present Example, the suitable proportion of the pigment is considered to be in the range of 3 to 20% by weight based on the total weight of the toner. One characteristic of the toner in accordance with this invention is that it does not appreciably produce an edge effect. It gives an image which is free from fogging and faithful to the original document.

Example D

The colors and specific charges of toners produced in the same way as in Example A using pigments Nos. 4 and 10 prepared in Example 2 were violet-13 μc/g, and red orange-16 μc/g, respectively. Images were formed by using these toners in the same way as in Example C. These images were free from fog and faithful to the document.

Example E

Color toners were prepared in the same way as in Example A using 270 parts of polystyrene (weight-average molecular weight 5,000) and 30 parts of each of the pigments shown in Table 10. The colors and specific charges of these toners are shown in Table 10. All of them gave images free from fog and faithful to the document.

TABLE 10

| Pigment No. | Color of the toner | Specific charge of the toner ($\mu$c/g) |
|---|---|---|
| 16 | Red orange | −12.8 |
| 20 | Brown | −13.1 |
| 31 | Crimson | −16.0 |
| 34 | Reddish orange | −14.7 |
| 40 | Reddish brown | −11.3 |
| 49 | Dark brown | −13.5 |
| 54 | Yellow | −11.9 |
| 62 | Lavender | −10.8 |

What we claim is:

1. A toner for electrophotography, comprising an azoic pigment having a silica core as a coloring component, and a resin medium for fixation, said azoic pigment comprising a core of a fine powder of silica and a coating of a monoor polyazoic dye chemically bound to the surface of the silica core through an aminosilane coupling agent.

2. The toner of claim 1 wherein the fine silica powder has a particle diameter of not more than 10 microns.

3. The toner of claim 1 wherein the fine silica powder has a surface OH density of at least 0.01/100 $Å^2$.

4. The toner of claim 1 wherein the aminosilane coupling agent is selected from compounds represented by the following formula $$(R^2O)_m R_n^3 Si-R^1-NH_2 \tag{II}$$

wherein $R^1$ represents a lower alkylene group which may contain —NH— or —NHCO— in the chain, $R^2$ represents a lower alkyl group, $R^3$ represents a hydrogen atom or a lower alkyl group, m is an integer of 1 to 3, and n is 0, 1 or 2 provided that m+n=3.

5. The toner of claim 4 wherein the aminosilane coupling agent is selected from $(C_2H_5O)_3Si-CH_2CH_2CH_2-NH_2$, $(CH_3O)_2(CH_3)Si-CH_2CH_2CH_2-NH-CH_2CH_2-NH_2$, $(CH_3O)_3Si-CH_2CH_2CH_2-NH-CH_2CH_2-NH_2$, $(C_2H_5O)_3Si-CH_2CH_2CH_2-NHCO-NH_2$, $(CH_3O)_3Si-CH_2CH_2CH_2-NH_2$, $(C_2H_5O)_2(CH_3)Si-CH_2CH_2CH_2-NH_2$, $(CH_3O)(CH_3)_2Si-CH_2CH_2CH_2CH_2-NH_2$, and $(C_2H_5O)(CH_3)_2Si-CH_2CH_2CH_2-NH_2$.

6. The toner of claim 1 wherein the azoic pigment has a basic structure represented by the following formula

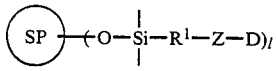
(I)

wherein (SP) represents the fine powder of silica, $R^1$ represents a lower alkylene group which may contain —NH— or —NHCO— in the chain; Z represents —NHCO, $-NH-CH_2-CH-$,
        $|$
        OH $-N=CH-$, $-NH-CH_2-$, $-NHSO_2-$, or $-NH-CH_2-CH_2-C-$;
                $\|$
                O D represents a residue of a mono- or polyazoic dye; and l is a number of at least 1.

7. The toner of claim 6 wherein D is selected from $$-Ar^1-N=N-Ar^2 \tag{1}$$

$$-Ar^1-N=N-Ar^3-N=N-Ar^2 \tag{2}$$

$$-Ar^1-NHCO-Ar^4-N=N-Ar^2 \tag{3}$$

$$-Ar^1-CONH-Ar^5-N=N-Ar^6-N=N-Ar^2 \tag{4}$$

$$-Ar^1-CONH-Ar^5-N-Ar^6-N=N-Ar^2 \tag{5}$$
$$\qquad\qquad\qquad\quad |$$
$$\qquad\qquad\qquad\;\, NO$$

wherein $Ar^1$, $Ar^3$, $Ar^4$, $Ar^5$ and $Ar^6$, independently from each other, represent a phenylene or naphthylene group which may be substituted, and $Ar^2$ represents a group of a coupling component.

8. The toner of claim 1 wherein the resin medium is an electrically insulating thermoplastic resin selected from polystyrene resins, polyalkylene resins, polyamide resins, polyester resins, polyvinyl acetal resin, acrylic resins, methacrylic resins and epoxy resins.

9. The toner of claim 8 wherein the electrically insulating thermoplastic resin is selected from a styrene/methyl methacrylate copolymer, a styrene/ethyl methacrylate copolymer, a styrene/butyl methacrylate copolymer, a styrene/2-ethylhexyl acrylate copolymer and a styrene/butadiene copolymer.

10. The toner of claim 1 wherein the resin medium for fixation has a glass transition temperature of at least 45° C.

11. The toner of claim 1 wherein the amount of the azoic pigment is 2 to 25 parts by weight per 100 parts by weight of the resin medium.

12. The toner of claim 1 wherein the fine silica powder has a particle diameter of not more than 5 microns.

13. The toner of claim 1 wherein the fine silica powder has a surface OH density of at least 1/100 $Å^2$.

14. The toner of claim 1 wherein the azoic pigment has a basic structure represented by the following formula

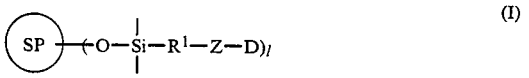
(I)

wherein (SP) represents the fine powder of silica, $R^1$ represents a lower alkylene group which may contain —NH— or —NHCO— in the chain; Z represents an amino bridging member; D represents a residue of a mono- or polyazoic dye; and l is a number of at least 1.

* * * * *